(12) United States Patent
Tamalet et al.

(10) Patent No.: US 8,433,817 B2
(45) Date of Patent: Apr. 30, 2013

(54) ROUTING-PROFILE-BASED ACARS ROUTING SYSTEM

(75) Inventors: Stephane Tamalet, Fonsorbes (FR); Gilles Gobbo, Aucamville (FR); Frederic Durand, Colomiers (FR); Jean-Georges Deville, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 256 days.

(21) Appl. No.: 12/681,475

(22) PCT Filed: Oct. 9, 2008

(86) PCT No.: PCT/EP2008/063545
§ 371 (c)(1),
(2), (4) Date: Jun. 4, 2010

(87) PCT Pub. No.: WO2009/047297
PCT Pub. Date: Apr. 16, 2009

(65) Prior Publication Data
US 2010/0293292 A1  Nov. 18, 2010

(30) Foreign Application Priority Data
Oct. 11, 2007 (FR) ..................................... 07 58211

(51) Int. Cl.
*G06F 15/173* (2006.01)

(52) U.S. Cl.
USPC ................................................ 709/238; 455/231

(58) Field of Classification Search .................. 709/238; 455/431
See application file for complete search history.

(56) References Cited

U.S. PATENT DOCUMENTS

2002/0009993 A1 * 1/2002 Dastrup et al. ............... 455/431
2005/0286452 A1   12/2005 Hardgrave et al.

FOREIGN PATENT DOCUMENTS

FR          2 787 658          6/2000
WO          WO 02/03572 A1     1/2002

* cited by examiner

*Primary Examiner* — Yves Dalencourt
(74) *Attorney, Agent, or Firm* — Oblon, Spivak, McClelland, Maier & Neustadt, L.L.P.

(57) ABSTRACT

A system for routing ACARS messages towards a plurality of transmission media, configured to be loaded onboard an aircraft, including: a database including a plurality of routing profiles, each profile being formed by a list indicating a rank of preference for each transmission medium, and a selection mechanism extracting, from an ACARS message sending request, a routing profile identifier, and selecting in the routing profile stored in the database, corresponding to the identifier, a transmission medium, according to its rank of preference, the thereby selected transmission medium then being used for transmitting the message.

6 Claims, 2 Drawing Sheets

ROUTING-PROFILE-BASED ACARS ROUTING SYSTEM

TECHNICAL FIELD

Figure 1:
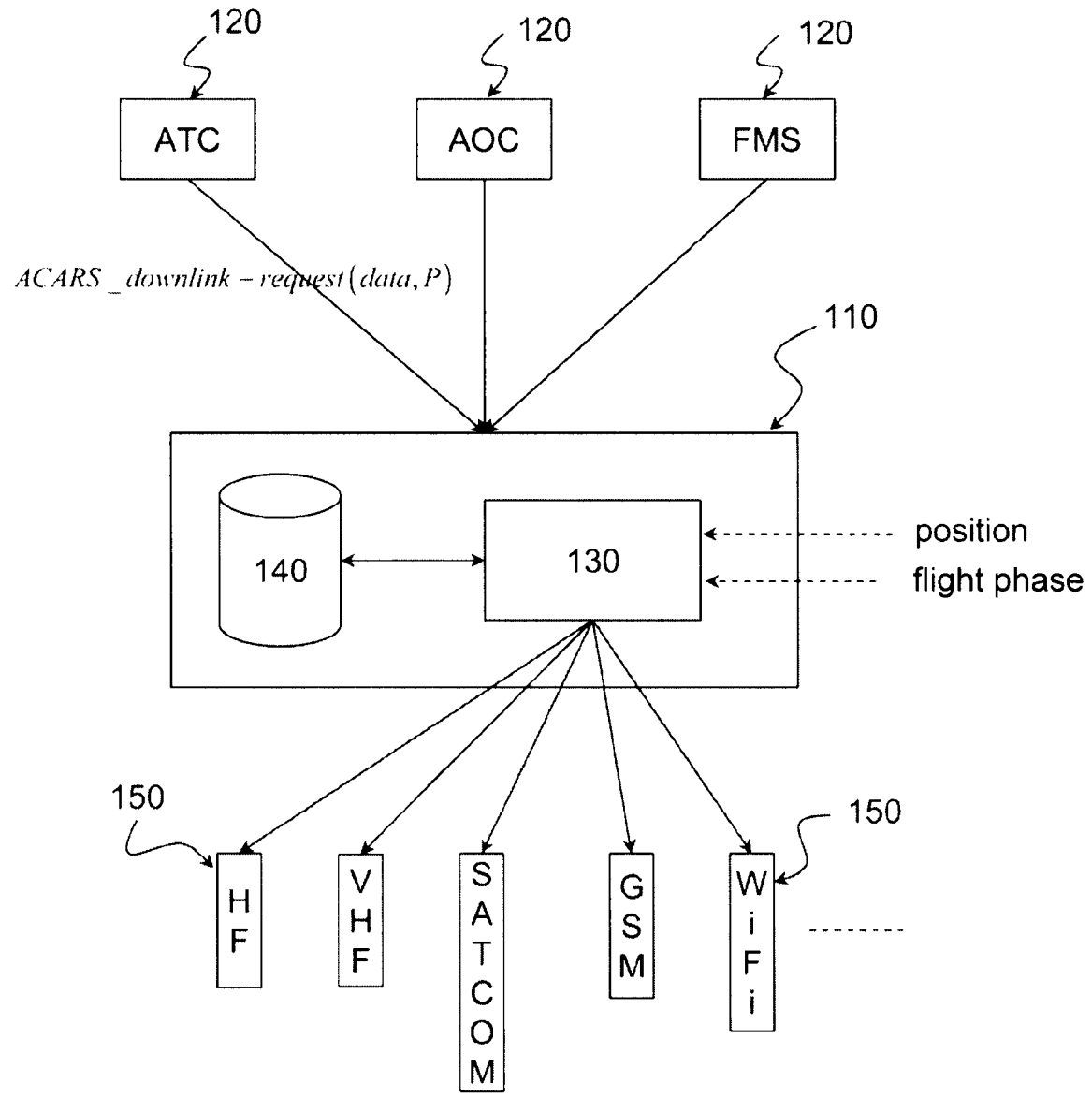

The present invention generally relates to aeronautical telecommunications and more particularly to that of ACARS (Aircraft Communication and Reporting System) routing.

STATE OF THE PRIOR ART

In the aeronautical field, with the ACARS system, data may be transmitted between an aircraft and an earth-borne station, notably with exchange of information of the AOC (Aeronautical Operational Control) type with airline operators or information of the ATC (Air Traffic Control) type with air controllers.

The ACARS system may use several transmission media (also called media in the state of the art), or more exactly several subnetwork types for transmitting data, i.e. HF, VHF or SATCOM subnetworks. The VHF telecommunications subnetwork allows point-to-point links in direct line of sight with transmitters/receivers on the ground but with a relatively reduced range. The satellite telecommunications subnetwork SATCOM on the other hand provides worldwide coverage, except for the polar regions, but with high communications costs. The HF subnetwork, as for it, provides coverage of the polar regions. The data link between onboard and the ground is sometimes designated by the generic term of <<datalink>>.

Generally, transmission of data to the ground is accomplished by means of an ACARS router. This router appears as a communications management piece of equipment or CMU (Communications Management Unit) which selects the most suitable transmission medium (VHF, HF, SATCOM) according to a certain number of parameters.

In practice, when an avionic application intends to transmit a message to the ground, it sends this message to the ACARS router accompanied by auxiliary information indicating, for each information medium, whether it may be used for the transmission and in which order of preference. For example, the avionic application may indicate: HF media forbidden; preference 1: VHF media; preference 2: SATCOM media. The CMU then receives the message, analyses the auxiliary information and selects the transmission medium accordingly. In the case of the aforementioned example, if the VHF medium is available, the message is sent via the latter. Otherwise, the SATCOM medium will be used for transmission.

Such a routing system has a certain number of drawbacks.

First of all, if it is desired that the ACARS router may use new transmission media such as for example WiMax, WiFi, GSM or UMTS links, the avionic applications have to be changed in order to integrate selection of these media in the auxiliary information. These modifications require that the relevant applications be subject to a new certification procedure which is long and costly.

Next, the performed routing does not take into the account the costs and performances of the different transmission media. For example, in the case of a relative change in the costs of use of these media, the indicated order of preference in the auxiliary information may prove to be unsuitable.

Finally, the routing options are relatively limited and unable to be customized by the airline.

The object of the present invention is to find a remedy to the aforementioned drawbacks and to notably propose a progressive, flexible and customizable routing system not requiring new certification of the avionic applications.

DISCUSSION OF THE INVENTION

The present invention is defined by a system for routing ACARS messages towards a plurality of transmission media, intended to be loaded onboard an aircraft, said system comprising:

a database containing a plurality of routing profiles, each profile being formed by a list indicating a rank of preference for each transmission medium;

selection means for extracting, from an ACARS message sending request, an identifier of a routing profile, and for selecting in the routing profile stored in the database, corresponding to said identifier, a transmission medium according to its rank of preference, said thereby selected transmission medium being then used for transmitting said message.

According to a first embodiment, the database contains, for each identifier, a plurality of routing profiles corresponding to distinct geographical areas and/or flight phases.

According to a second embodiment, the selection means are adapted for receiving position information from said aircraft, and for determining, for a given identifier, the routing profile corresponding to the geographical area and/or flight phase in which the aircraft is found, and then selecting, within the thereby determined profile, a transmission medium according to its rank of preference.

According to a first variant of the first and second embodiments, the database further comprises for each routing profile, a list of parameters intended for managing transmission buffers associated with the different transmission media.

According to a second variant of the first and second embodiments, said selection means are adapted for further extracting from an ACARS message sending request, a list of parameters intended for managing transmission buffers associated with the different transmission media.

According to a third variant of the first and second embodiments, the system further comprises a second database containing a plurality of parameterization profiles, each parameterization profile being formed by a list of parameters intended for managing transmission buffers associated with the different transmission media, said selection means being adapted for extracting from a request for sending ACARS messages, a second identifier and for recovering a parameterization profile stored under this identifier.

Said list of parameters may notably comprise the following parameters: a parameter indicating the maximum number of transmission attempts over a selected medium, a parameter indicating whether the message is to be deleted in the case of a transmission failure over a selected medium, a parameter indicating whether the message is deleted if no medium is available in the list, a parameter indicating whether the message is to be sent over the next medium of the list in the case when the selected medium is busy.

The aforementioned transmission media for example belong to the group formed by SATCOM, HF, VHF, GSM, UMTS, WiMax and Wi-Fi links.

The invention also relates to an ACARS routing system as defined above.

SHORT DESCRIPTION OF THE DRAWINGS

Figure 2:
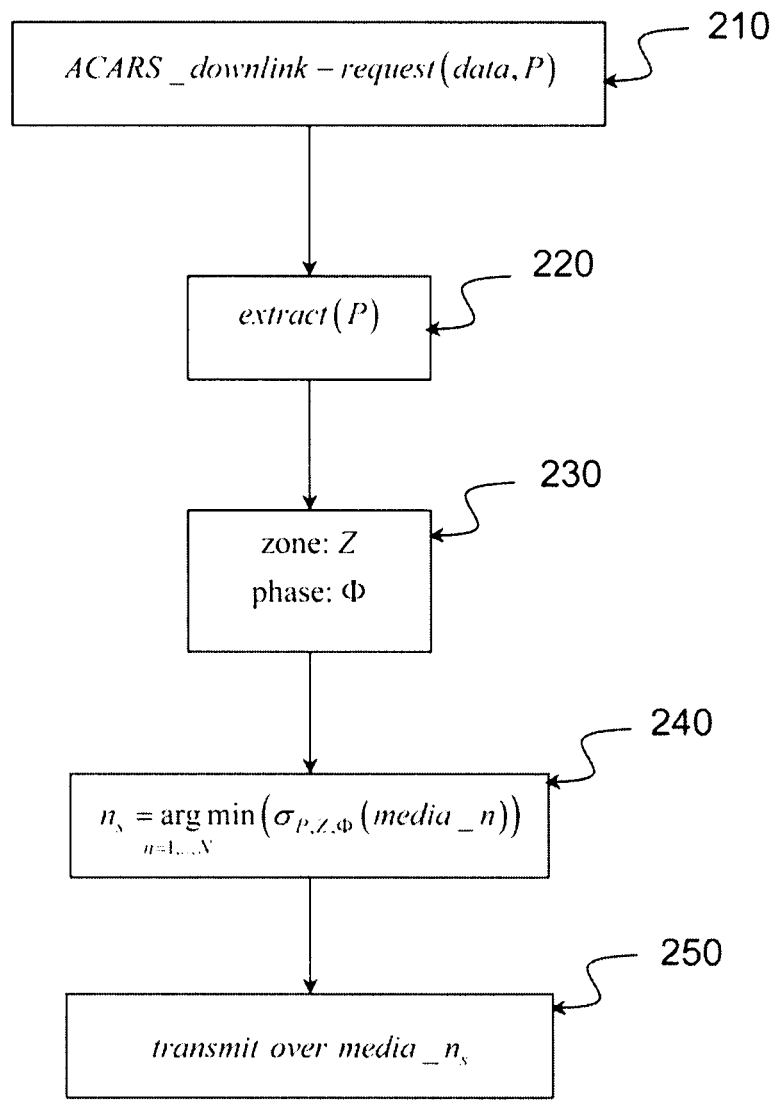

Other features and advantages of the invention will become apparent upon reading a preferential embodiment of the invention with reference to the appended figures wherein:

FIG. 1 schematically illustrates a routing system according to a first embodiment of the invention;

FIG. 2 schematically illustrates a routing procedure according to the second embodiment of the invention.

DETAILED DISCUSSION OF PARTICULAR EMBODIMENTS

The idea at the basis of the present invention is to propose an ACARS routing system performing transmission medium selection depending on different criteria, for example a cost criterion, a reliability criterion, a throughput criterion, a cost/performances ratio criterion. A criterion is practically expressed by a routing profile indicating the media which may be used for transmission and their order of preference.

FIG. 1 schematically illustrates a ACARS routing system according to an embodiment of the invention.

The routing system 110 receives ACARS messages from avionic applications, 120, for example from an air traffic management application, a so-called ATC (Air Traffic Control) application or a flight management application a so-called FMS (Flight Management System) application. The avionic applications 120 communicate with ground installations by means of ACARS messages. Thus, an ATC application may send ACARS messages, as defined in the standard Arinc 623, towards a ground control station and receive them. Also, an AOC type application may transmit and receive ACARS messages, defined in the Arinc 633 standard, to/from the operational centre of the airline.

The messages are transmitted via a plurality of transmission media 150, for example subnetworks conventionally used in aeronautics such as SATCOM, VHF, HF subnetworks but also those of the general public type such as GSM, UMTS, WiFi or WiMAx.

The routing system 110 comprises selection means 130 connected to a data base 140. The selection means 130 receive requests for sending ACARS messages from different avionic applications and extract from each request an identifier of the routing profile. This identifier appears as a piece of auxiliary information, concatenated to the data transmitted by the application. Thus, a sending request will generally have the following form: ACARS_downlink−request(data,P) where P is a routing profile identifier for the transmitting the data as data.

The database comprises an entry for each identifier, a list of ranks of preference for the different transmission media being stored for each profile. A routing profile of identifier P is defined by a vector $\sigma_P=(\sigma_P(\text{media\_1}), \sigma_P(\text{media\_2}), \ldots, \sigma_P(\text{media\_N}))$ wherein N is the number of transmission media, media_1, media_2, ..., media_N are the relevant media, and wherein $\sigma_P$ is an application assigning to each transmission medium a rank of preference for the relevant profile. A particular rank, for example a rank of value zero, may be assigned in order to indicate a forbidden transmission medium. If necessary, this vector may comprise several ranks of the same value, in which case the corresponding media may indifferently be selected for transmitting the message.

The selection means 130 recover from the database 140, from the profile identifier P, the corresponding list of ranks of preference. The transmission medium having the rank of highest preference is first of all selected. If, the relevant medium is not available or further if the transmission fails on this medium, the selection means may select a medium of same rank, or by default of the next rank. The order in which the media of same rank are selected is immaterial.

The selection process is repeated until the message is sent or until a failure is ascertained for the medium of lesser preference, the media of rank zero not being taken into account insofar that they are forbidden.

The routing profiles may be predefined by the manufacturer or customized by the airline. For example the manufacturer may, by default, propose a routing profile complying with a criterion of lesser cost, a routing profile complying with a maximum reliability criterion (minimum error rate), a routing profile complying with a criterion of best cost/performances ratio. The airline may add additional routing profiles which they will define by specifying for each of them the respective ranks of preference which they wish to assign to the different transmission media.

Table 1 gives three examples of routing profiles stored in database 140, the profile $P_1$ corresponds to a criterion of lesser cost, the profile $P_2$ to a maximum reliability criterion, and the criterion $P_3$ was defined by the airline.

TABLE 1

| Media/routing profile | $P_1$ | $P_2$ | $P_3$ |
|---|---|---|---|
| Satcom Data 2 | 6 | 5 | 1 |
| Satcom Data 3 via GACS and the ATN stack | 5 | 5 | 2 |
| HF DLS | 3 | 8 | 3 |
| HF RLS via GACS and the ATN stack | — | — | 4 |
| VHF Mode A with the VHF DSP 1 | 3 | 7 | 5 |
| VDL AOA with the VHF DSP 1 | 2 | 4 | 6 |
| VDL Mode 2 via GACS and the ATN stack with the VHF DSP 1 | 1 | 2 | 0 |
| VHF Mode A with the VHF DSP 2 | 7 | 6 | 0 |
| VDL AOA with the VHF DSP 2 | 4 | 3 | 0 |
| VDL Mode 2 via GACS and the ATN stack with the VHF DSP 2 | 4 | 1 | 0 |

The table provides for each of the profiles $P_1$, $P_2$, $P_3$ the respective ranks of preference of the different transmission media. In this table high preference is expressed by a low rank. Of course, an opposite convention may be adopted.

For example, for the profile $P_1$, preference will be given to the medium designated as <<VDL Mode 2 via GACS and the ATN stack with the VHF DSP 1>>, in other words, an emulated VHF link on a ATN network by means of a GACS service (Generic ATN Communication Service). Conversely, as the medium designated as <<SATCOM Data 2>> is the most expensive, it is the less preferred.

Similarly, for the profile $P_2$, preference is given to the medium designated as <<VDL Mode 2 via GACS and the ATN stack with the VHF DSP 1>> (ATN: Aeronautical Telecommunication Network). Conversely the medium designated as <<HF DLS>> (DLS: Direct Link Service), i.e. the HF link, is the less preferred.

According to a second embodiment, this selection means 130 are adapted for receiving position information from the aircraft and/or a flight phase indication, via an AFDX (Avionics Full DupleX) bus or a conventional Arinc 429 (cf. arrows in dashed lines in FIG. 1). For example, the position information may be provided by the navigation system and consist of the GPS coordinates of the aircraft. The flight phase indication may be provided by a ground proximity sensor or further a pressure sensor on the landing gear.

In this variant, the database is portioned into geographical areas and/or flight phases. The selection means then perform selection of the routing profile depending on the profile identifier extracted from the sending request, of the geographical area in which the aircraft is found and/or of the flight phase.

Table 2 below gives an example of the database organization for a routing system according to the second embodiment of the invention, wherein only discrimination by geographical area is contemplated. It is noted that for a given identifier P, the database contains a first profile relative to the Europe area and a second profile relative to the remainder of the world.

TABLE 2

| Area | Media/Routing profile | P₁ | P₂ | P₃ |
|---|---|---|---|---|
| EUROPE | Satcom Data 2 | 6 | 5 | 1 |
| | Satcom Data 3 via GACS and the ATN stack | 5 | 5 | 2 |
| | HF DLS | 3 | 8 | 3 |
| | HF RLS via GACS and the ATN stack | 0 | 0 | 4 |
| | VHF Mode A with the VHF DSP 1 | 3 | 7 | 5 |
| | VDL AOA with the VHF DSP 1 | 2 | 4 | 6 |
| | VDL Mode 2 via GACS and the ATN stack with the VHF DSP 1 | 1 | 2 | 0 |
| | VHF Mode A with the VHF DSP 2 | 7 | 6 | 0 |
| | VDL AOA with the VHF DSP 2 | 4 | 3 | 0 |
| | VDL Mode 2 via GACS and the ATN stack with the VHF DSP 2 | 4 | 1 | 0 |
| AILLEURS | Satcom Data 2 | 1 | 10 | 10 |
| | Satcom Data 3 via GACS and the ATN stack | 2 | 9 | 9 |
| | HF DLS | 3 | 8 | 8 |
| | HF RLS via GACS and the ATN stack | 4 | 7 | 7 |
| | VHF Mode A with the VHF DSP 1 | 5 | 6 | 6 |
| | VDL AOA with the VHF DSP 1 | 6 | 5 | 5 |
| | VDL Mode 2 via GACS and the ATN stack with the VHF DSP 1 | 7 | 4 | 4 |
| | VHF Mode A with the VHF DSP 2 | 8 | 3 | 3 |
| | VDL AOA with the VHF DSP 2 | 9 | 2 | 2 |
| | VDL Mode 2 via GACS and the ATN stack with the VHF DSP 2 | 10 | 1 | 1 |

FIG. 2 illustrates a procedure for selecting the transmission medium according to a second embodiment of the invention.

In step 210, an avionic application transmits to the routing system a request for sending an ACARS message over the downlink, in the form of ACARS_downlink-request(data,P).

In step 220, the selection means extract the profile identifier P from the request.

In step 230, the selection means recover position information and/or flight phase indication of the aircraft. The selection means infer from the position information the geographical area Z in which the aircraft is found.

In step 240, from the identifier P, the area Z and the flight phase Φ, the selection means recover the corresponding profile $\sigma_{P,Z,\Phi}$ in the database and selects in this profile, the transmission medium having the rank of highest preference, i.e.

$$n_s = \underset{n=1,\ldots,N}{\arg\min} \; \sigma_{P,Z,\Phi}(\text{media\_n})).$$

For example, if P identifies the lesser cost profile, Z is Europe, and Φ is the phase where the aircraft is parked at the boarding gate, the selected transmission medium will be a WiFi link.

In step 250, the message is transmitted over the selected medium media_$n_s$.

With this variant, each airline may select its communication policy with the ground. If new media appear in a given geographical area or if the relative costs of these media change, it will be simply necessary to update the database without having to certify the avionic applications again.

According to a first variant of the first or second embodiment, the database 140 further contains parameters for managing transmission buffers for each of the routing profiles. With each transmission medium is associated a buffer in which are stored the messages to be sent over this medium. Indeed, the messages to be transmitted over a transmission medium are generally not sent directly but placed in a queue. The aforementioned parameters allow management of the filling rate of the different buffers. For example, use may be made of:

- a parameter (<<message retry counter>>) indicating the maximum number of transmission attempts over the selected medium. The buffer is purged of the message if the last attempt fails;
- a parameter (<<purge on com>>) indicating that the message is to be deleted in the case of a transmission failure over the selected medium. The buffer associated with this medium is then purge accordingly;
- a parameter (<<purge on fail>>) indicating that the message is deleted in the case when no transmission medium is available;
- a parameter (<<next on busy>>) indicating that the message to be sent over the next medium (in the order of preference) of the routing profile when the selected medium is busy.

Table 3 illustrates the organization of the database in the case of the aforementioned alternative, for the first embodiment of the invention. The database contains for each profile, the transmission buffer management parameters associated with this profile.

TABLE 3

| Media/routing profile | P₁ | P₂ | P₃ |
|---|---|---|---|
| Satcom Data 2 | 6 | 5 | 1 |
| Satcom Data 3 via GACS and the ATN stack | 5 | 5 | 2 |
| HF DLS | 3 | 8 | 3 |
| HF RLS via GACS and the ATN stack | — | — | 4 |
| VHF Mode A with the VHF DSP 1 | 3 | 7 | 5 |
| VDL AOA with the VHF DSP 1 | 2 | 4 | 6 |
| VDL Mode 2 via GACS and the ATN stack with the VHF DSP 1 | 1 | 2 | 0 |
| VHF Mode A with the VHF DSP 2 | 7 | 6 | 0 |
| VDL AOA with the VHF DSP 2 | 4 | 3 | 0 |
| VDL Mode 2 via GACS and the ATN stack with the VHF DSP 2 | 4 | 1 | 0 |
| Message Retry Counter | 3 | 2 | 0 |
| Purge on no com | NO | YES | NO |
| Purge on Fail | YES | YES | NO |
| Next on busy | NO | YES | NO |

According to a second variant, the parameters are not stored in the database but provided by means of auxiliary information comprised in the request for sending the message. More specifically, for a message to be transmitted over the downlink, the sending the form of ACARS_downlink-request(data, P, $\mu_1, \ldots, \mu_L$) wherein $\mu_1, \ldots, \mu_L$ is a list of transmission buffer management parameters, the selection means are adapted for extracting these parameters in the same way as for the profile identifier and for controlling the buffers accordingly.

According to a third variant of the invention, the routing means further comprise a first database comprising the routing profiles, a second database comprising profiles for parameterization of the transmission. A parameterization profile is formed by a list of predefined parameter values, for example transmission buffer management parameters.

Table 4 illustrates an organization example of the second database with the parameters <<message retry counter>>, <<purge on com>>, <<purge on fail>>, <<next on busy>> indicated above. The parameterization profiles M₁, M₂, M₃, M₄ are predefined by the manufacturer or else defined by the airline. For a message to be transmitted over the downlink, the sending request will have the form of ACARS_downlink-request(data,P,M) wherein P and M are the routing and parameterization identifiers respectively. The identifier P allows the preferred transmission medium to be selected in the first database, while the identifier M allows parameterization of the use of the transmission buffers.

TABLE 4

| Parameters/<br>Parameterization profiles | $M_1$ | $M_2$ | $M_3$ | $M_4$ |
|---|---|---|---|---|
| Message Retry Counter | 3 | 4 | 2 | 3 |
| Purge on no com | Yes | Yes | No | No |
| Purge on Fail | Yes | Yes | Yes | No |
| Next on busy | Yes | No | No | No |

It is clear for one skilled in the art that other profiles of parameters may be contemplated without however departing from the scope of the present invention.

The invention claimed is:

1. A system for routing ACARS messages towards a plurality of transmission media, configured to be loaded onboard an aircraft, comprising:
a database including a plurality of routing profiles, each profile including a list indicating a rank of preference for transmission media in the plurality of transmission media, and each routing profile further including buffer management parameters configured to manage transmission buffers that are each associated with a different one of the transmission media and are each configured to store messages to be sent over the corresponding transmission media;
a selection section that receives a request, from an avionic application, to send an ACARS message from the aircraft to the ground, the request including a routing profile identifier and a content of the ACARS message; and
the selection section is configured to extract the routing profile identifier from the ACARS message sending request sent by the avionic application, select a routing profile stored in the database that corresponds to the routing profile identifier extracted from the request, and select a transmission medium according to a rank of preference in the selected routing profile, the selected transmission medium being used for transmitting said ACARS message according to the buffer management parameters in the selected routing profile.

2. The system for routing ACARS messages according to claim 1, wherein the database includes, for each identifier, a plurality of routing profiles corresponding to geographical areas and/or distinct flight phases.

3. The system for routing ACARS messages according to claim 2, wherein the system receives position information from the aircraft, and determines, for a given identifier, the routing profile corresponding to the geographical area and/or flight phase in which the aircraft is found, and then selects, within the thereby determined profile, a transmission medium according to the rank of preference.

4. The system for routing ACARS messages according to claim 1, wherein the buffer management parameters include:
a parameter indicating a maximum number of transmission attempts over a selected medium;
a parameter indicating whether the message is to be deleted in a case of a transmission failure over a selected medium;
a parameter indicating whether the message is deleted if no medium is available in the list;
a parameter indicating whether the message is to be sent over a next medium of the list in the case when the selected medium is busy.

5. The system for routing ACARS messages according to claim 1, wherein the transmission media belong to the group formed by SATCOM, HF, VHF, GSM, UMTS, WiMax and Wi-Fi links.

6. An aircraft comprising:
an ACARS routing system according to claim 1.

* * * * *